(12) United States Patent  (10) Patent No.: US 7,494,407 B1
Turley                     (45) Date of Patent:     Feb. 24, 2009

(54) TAXIDERMIC EAR OPENING TOOL

(76) Inventor: Douglas E. Turley, 901 I N.W., Miami, OK (US) 74354

( * ) Notice: Subject to any disclaimer, the term of this patent is extended or adjusted under 35 U.S.C. 154(b) by 218 days.

(21) Appl. No.: 11/490,445

(22) Filed: Jul. 19, 2006

(51) Int. Cl.
    *A22B 5/16* (2006.01)
(52) U.S. Cl. ........................................ 452/132
(58) Field of Classification Search ............. 452/82, 452/83, 102–107, 117, 123, 124, 125, 128, 452/132, 135–137; 43/2, 3; 434/295, 296, 434/263, 297; 222/333, 325–327, 330, 390, 222/391, 80–83, 160
See application file for complete search history.

(56) References Cited

U.S. PATENT DOCUMENTS

| 2,136,492 | A | * | 11/1938 | Creveling | 141/311 R |
| 2,489,734 | A |   | 11/1949 | Walsh |  |
| 2,545,718 | A |   | 3/1951  | Weber |  |
| 2,992,494 | A |   | 7/1961  | Jonas, Jr. |  |
| 3,451,396 | A |   | 6/1969  | Collins |  |
| 4,174,068 | A | * | 11/1979 | Rudolph | 239/322 |
| 4,635,319 | A |   | 1/1987  | Gast |  |
| 4,710,998 | A |   | 12/1987 | Gast |  |
| 5,320,633 | A |   | 6/1994  | Allen et al. |  |
| 5,482,189 | A | * | 1/1996  | Dentler et al. | 222/391 |
| 5,535,925 | A | * | 7/1996  | Hinden et al. | 222/327 |
| 5,553,754 | A | * | 9/1996  | Dentler | 222/391 |
| 5,567,161 | A |   | 10/1996 | Kallina |  |
| 5,595,327 | A | * | 1/1997  | Dentler et al. | 222/327 |
| 5,626,514 | A |   | 5/1997  | Rothove |  |
| 5,860,568 | A | * | 1/1999  | Mallalieu et al. | 222/83.5 |
| 5,887,765 | A | * | 3/1999  | Broesamle | 222/391 |
| 6,203,418 | B1|   | 3/2001  | Hendrickson |  |
| 6,325,249 | B1| * | 12/2001 | Keller | 222/137 |
| 6,439,439 | B1| * | 8/2002  | Rickard et al. | 222/391 |
| 6,530,933 | B1|   | 3/2003  | Yeung et al. |  |

* cited by examiner

*Primary Examiner*—Thomas Price
(74) *Attorney, Agent, or Firm*—William R. Sharp

(57) ABSTRACT

A taxidermic ear opening tool for use upon an animal's ear which has skin with an underside thereof connected to cartilage, comprising: a tool body; a hook member fixedly connected to the tool body and having at least one prong that is engageable with the underside of the skin so as to secure the tool body with respect thereto; a rod having a longitudinal axis and opposing front and rear ends, the rod being received by the tool body so as to allow longitudinal movement of the rod with respect to the tool body; a separation member fixedly connected to the rod at or closely adjacent to its front end, the separation member lying in a plane substantially parallel and adjacent to the longitudinal axis of the rod; and a rod advancement means for moving the rod and associated separation member longitudinally and forwardly, whereby such forward movement of the separation member as positioned between the skin and cartilage separates the skin from the cartilage.

10 Claims, 2 Drawing Sheets

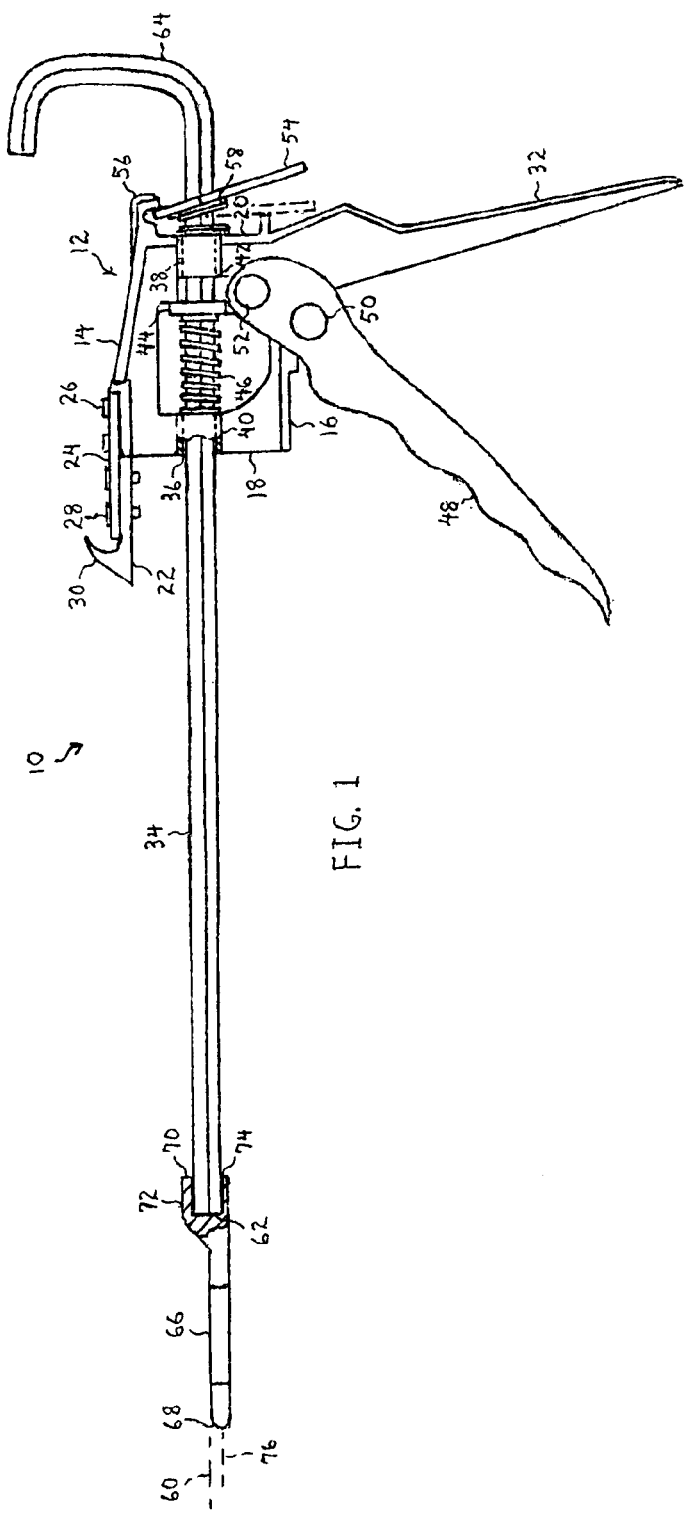
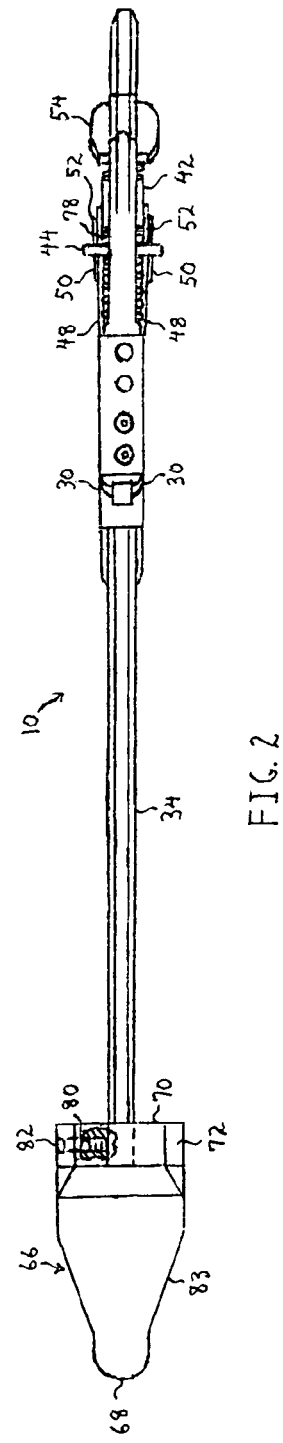
FIG. 1
FIG. 2

TAXIDERMIC EAR OPENING TOOL

BACKGROUND OF THE INVENTION

The invention relates to the field of taxidermy, and more specifically to the separation of skin from the cartilage of an animal's ear in a procedure known to taxidermists as "opening" the ear. Opening the ears is typically the most time consuming aspect of removing the skin (i.e. hide) from an animal's skull for tanning and mounting. The skin or hide as thus removed is commonly called the cape.

Heretofore, opening of the ears has been carried out with a scalpel and/or a conventional "ear opener". The scalpel is employed to tediously and laboriously cut away the connecting tissue between the skin and cartilage of an ear. The commercially available ear opener looks much like needle nosed pliers, including a pair of handles and a corresponding pair of elongated jaws that work upon a pivot. Unlike regular pliers, however, squeezing the handles of the ear opener causes the jaws to spread apart rather than come together. In use, the jaws, as inserted between the skin and cartilage, are intended to tear the skin from the cartilage as they open or spread apart. However, this requires considerable force by the taxidermist in squeezing the handles, and is not very effective or fast in separating the skin from the cartilage.

SUMMARY OF THE INVENTION

It is, therefore, an object of the invention to provide a new and improved ear opening tool that is effective, easy to use, and faster in opening an ear than the tools and techniques of the prior art.

The above object is realized by a taxidermic ear opening tool for use upon an animal's ear which has skin with an underside thereof connected to cartilage, comprising: a tool body; a hook member fixedly connected to the tool body and having at least one prong that is engageable with the underside of the skin so as to secure the tool body with respect thereto; a rod having a longitudinal axis and opposing front and rear ends, the rod being received by the tool body so as to allow longitudinal movement of the rod with respect to the tool body; a separation member fixedly connected to the rod at or closely adjacent to its front end, the separation member lying in a plane substantially parallel and adjacent to the longitudinal axis of the rod; and a rod advancement means for moving the rod and associated separation member longitudinally and forwardly, whereby such forward movement of the separation member as positioned between the skin and cartilage separates the skin from the cartilage.

In a preferred embodiment hereafter described, the ear opening tool further comprises a handle depending from the tool body, and a trigger pivotally connected to the tool body adjacent to the handle and being operably coupled to the rod so that pivotal and generally rearward movement of the trigger moves the rod and associated separation member longitudinally and forwardly.

The ear opening tool of the invention has been found to be very easy to use in effectively opening an animal's ear without tearing or in any way damaging the skin. Moreover, the ear opening procedure can be performed with the invention in much less time than required when using those conventional tools and techniques of the prior art, as previously described. Opening an animal's ear in accordance with the prior art can take up to about 45 minutes, whereas opening the same ear with the tool of the invention will usually require no more than about 10-15 minutes, depending of course upon the size of the ear and other factors.

BRIEF DESCRIPTION OF THE DRAWINGS

FIG. 1 is a side view of the ear opening tool in accordance with a preferred embodiment of the invention, which employs a particular commonly used separation member.

FIG. 2 is a top, plan view of the ear opening tool shown in FIG. 1.

DESCRIPTION OF A PREFERRED EMBODIMENT

Figure 3:
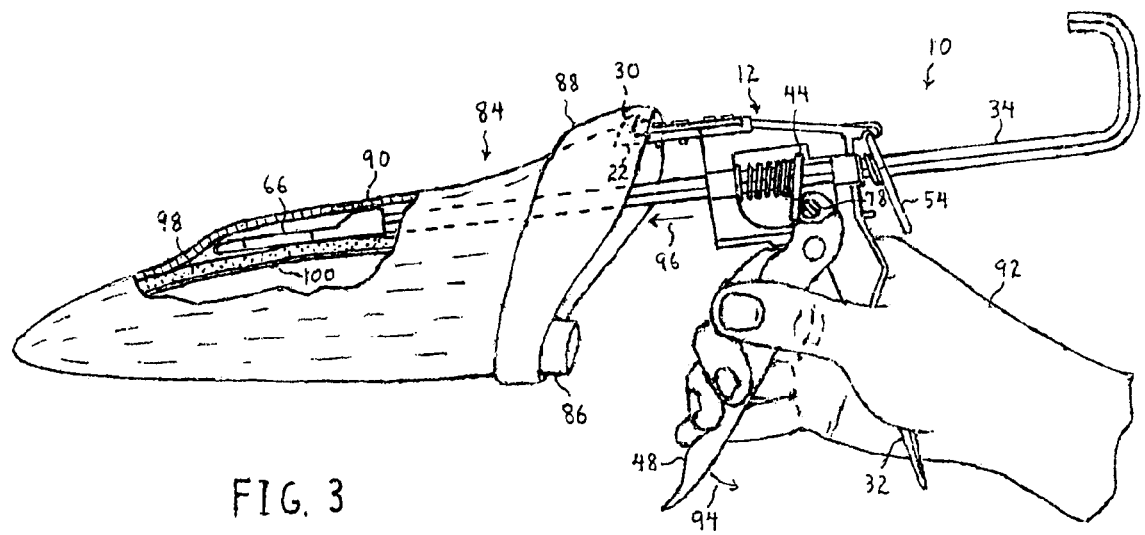
FIG. 3 is a view showing the ear opening tool in use for separating the skin from the cartilage of an animal's ear.

Referring to FIG. 1, the illustrated ear opening tool 10 includes a tool body 12 having a top 14, a bottom 16, a front 18, and a back 20. A hook member 22 is fixedly connected to top 14 with a mounting plate 24. Mounting plate 24 is received in a recess in top 14 adjacent to front 18, and is secured to top 14 with suitable fasteners 26. As shown, mounting plate 24 extends outwardly and forwardly from tool body 12. Hook member 22 is secured to the underside of mounting plate 24 with fasteners 28, such that the back end of hook member 22 abuts front 18 of tool body 12. Mounting hook member 22 in this manner optimizes the strength and stability of the connection to tool body 12. Hook member 22 has, adjacent to its front end, at least one prong 30 with a sharp tip that points in a generally rearward direction. Although the hook member of the illustrated embodiment actually has two prongs, only one of the prongs is visible in FIG. 1. Whereas top 14 of tool body 12 has hook member 22 fixedly connected thereto, a handle 32 fixedly depends from, and is preferably integral with, the tool body's bottom 16.

Ear opening tool 10 further includes a rod 34 slidably received through tool body openings 36 and 38 so as to allow longitudinal movement of the rod with respect to tool body 12. Portions of tool body 12 form sleeve bearings 40 and 42 for respectively defining openings 36 and 38. As shown, sleeve bearing 40 and its corresponding opening 36 are adjacent to front 18 of tool body 12, and sleeve bearing 42 and its corresponding opening 38 are adjacent to back 20 of the tool body. A portion of sleeve bearing 40 is broken away to reveal a front portion of opening 36, and the remaining portion of opening 36 is indicated by broken lines. All of opening 38 is indicated by broken lines.

A driving dog 44 and spring 46 are received on rod 34 within an open space defined within tool body 12. The front end of spring 46 abuts sleeve bearing 40, and the back end of such spring abuts driving dog 44. Accordingly, spring 46 biases driving dog 44 to the position indicated in FIG. 1 when ear opening tool 10 is not in operation. A trigger 48 is pivotally connected to tool body 12 between opposing pivot heads 50 adjacent to handle 32, and is operably coupled to rod 34 by means of driving dog 44 and another element not shown in FIG. 1, but connected to the trigger between opposing heads 52. This coupling mechanism will be further explained below. Only one of heads 50 and one of heads 52 are visible in FIG. 1.

A stop dog 54 is received on rod 34 adjacent to back 20 of tool body 12. The upper end of stop dog 54 is received in a recess defined by an extension member 56, which extends from back 20 of the tool body adjacent to its top 14. A spring 58 is received on rod 34 between stop dog 54 and sleeve bearing 42 so as to bias the stop dog to the inclined or tilted position indicated by solid lines. In such position, stop dog 54 engages rod 34 so as to prevent its rearward movement but allow forward movement. A user of the tool can apply forward pressure to stop dog 54 with his or her thumb (not shown) to move the stop dog to the position indicated in phantom lines, thereby releasing rod 34 and allowing rearward movement thereof. Upon removal of pressure upon stop dog 54, spring 58 will automatically bias the stop dog back to the original position in solid lines. Therefore, stop dog 54 is selectively positionable to prevent or allow rearward movement of rod 34. Of course, although not shown, it is understood that stop dog 54 as well as driving dog 44 have respective openings that receive rod 34 therethrough.

With further reference to rod 34, the preferably hexagonal rod has a longitudinal axis 60 and opposing front and rear ends 62 and 64, respectively. A separation member 66 has a front end 68, an opposing rear end 70, and a rear portion 72 with an opening 74 extending forwardly from rear end 70. Most of rear portion 72 is shown in cross section in order to clearly show the manner in which a front end portion of rod 34, including front end 62, is closely received by and in opening 74. Rear portion 72 is consequently sufficiently thick to accommodate the diameter of rod 34. As will be explained further below, separation member 66 is fixedly connected to rod 34 at or closely adjacent to front end 62 of the rod. Separation member 66 also lies in a plane, indicated at 76, that is substantially parallel and adjacent to longitudinal axis 60 of rod 34. Rear end 64 of rod 34 is shown as being shaped to accommodate easy grasping with one hand (not shown), whenever it is desired to pull rod 34 in a rearward direction after positioning stop dog 54 in its position shown in phantom lines. When rod 34 is about is in its maximally forward position as illustrated in FIG. 1, it will need to be pulled rearwardly in order to prepare the tool for use.

Referring to FIG. 2, this top view of ear opening tool 10 shows both of prongs 30, as well as the upper end of driving dog 44, portions of trigger 48 on opposite sides thereof, each of opposing heads 50, each of opposing heads 52, and outer portions of a shaft 78 discussed further below and extending between heads 52. This view shows stop dog 54 in its outwardly biased position, as indicated by solid lines as in FIG. 1. In regard to separation member 66, its upper surfaces are visible in FIG. 2, with the exception of a small part of rear portion 72 that is shown in cross section to reveal a set screw 80 threadedly received by a hole 82 in the rear portion so as to snugly abut rod 34 adjacent to the front end thereof. Accordingly, separation member 66 is securely but removably received on rod 34.

As shown, separation member 66 decreases or remains constant in width as extending from its rear end 70 to its front end 68, with at least a portion indicated at 83 being tapered so as to progressively decrease in width toward front end 68. The latter feature provides for an incremental and gradual separation of skin from cartilage when the tool is in use, thereby minimizing necessary pressure by the user and minimizing the chance of tearing the skin, as will be apparent from subsequent discussion with reference to FIG. 3. Front end 68 of separation member 66 is also preferably rounded in shape as depicted in FIG. 2 to further ensure against tearing or splitting of the skin, particularly at the tip of an ear. The particular separation member shown in FIGS. 2 and 3 is generally configured and sized to be particularly suitable for opening ears of white-tailed deer, or other big game animals having similarly shaped and sized ears.

Referring to FIG. 3, ear opening tool 10 is shown in use for opening an ear 84 of a big game animal (i.e. white-tailed deer) after the head has been skinned around the ear and ear butt 86 severed close to the skull. Skin and other tissue, including that which has been cut away from ear butt 86, is shown as being folded back at 88. Although not shown for simplicity and clarity of illustration, a portion of the ear would typically still be attached to the "cape" previously separated from the skull.

As further shown in FIG. 3, prongs 30 (indicated by broken lines) of hook member 22 are engaged with and preferably penetrate the underside of skin 90 adjacent to the "bottom" end of ear 84, which is on the right side of the ear as oriented in FIG. 3. Therefore, hook member 22, as fixedly connected to tool body 12, secures the tool body with respect to the skin 90, of which the underside thereof is normally connected to cartilage in ear 84 with connective tissue. Skin 90 is on what is considered the back side of ear 84.

In operating ear opening tool 10, a user of the tool positions one of his hands, as shown at 92, so that handle 32 is held in the palm of the hand adjacent to the base of the thumb, and at least several fingers are wrapped around trigger 48. With stop dog 54 in its position for preventing rearward movement but allowing forward movement of rod 34, the user applies pressure to trigger 48 with his fingers so as to cause pivotal and generally rearward movement of the trigger as indicated by the arrow at 94. This results in forward movement of shaft 78, which is shown in cross section with a portion of one side of trigger 48 broken away. Consequently, shaft 78 exerts forward pressure upon the lower end of driving dog 44, causing it to tilt or incline as shown to thereby engage rod 34 and move the rod and associated separation member 66 longitudinally and forwardly. Such forward movement is indicated by the arrow at 96. A portion of ear 84 is broken away to reveal separation member 66 as positioned between skin 90 and cartilage 98. Accordingly, forward movement of separation member 66 functions to separate skin 90 from cartilage 98 as illustrated. Such separation is accomplished quickly and easily without causing damage to skin 90.

Of course, as driving dog 44 moves forwardly with rod 34, spring 46 is progressively compressed. Although not shown, when the driving dog reaches its maximally forward position, the user releases pressure on the trigger to allow the driving dog to be moved freely and rearwardly along the rod by the biasing force of the spring until the driving dog returns to its original position. The user repeats actuation of the trigger and associated forward movement of the rod and separation member, as necessary, until the separation member reaches the tip of the ear. The stop dog is then moved to that position shown by phantom lines in FIG. 1, thereby allowing rearward movement of the rod and separation member, and consequent release of the considerable tension upon the skin that has developed during use of the tool. The prongs of the hook member can now be detached from the skin by moving the tool in a forward direction, and the rod and separation member are withdrawn from the ear.

One or more additional passes are usually necessary to separate the full width of the skin from the cartilage, and the thus separated skin is turned inside out, as is conventional, in preparation for tanning. Note that the skin discussed so far is that thick layer of skin at the back of the ear. Referring again to FIG. 3, a very thin layer of skin 100 is connected to cartilage 98 on what is considered the front of the ear. Skin 100 is not normally separated from the cartilage, but is instead left in place for the tanning process.

As previously discussed with reference to FIG. 2, separation member 66 is removable from rod 34. Set screw 80 can be loosened or entirely removed to allow separation member 66 to be pulled off of rod 34. An alternative separation member can be installed upon a front end portion of the rod, and secured thereto with a set screw in the manner previously described.

Figure 4:
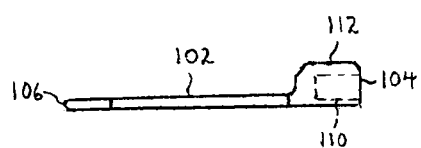
FIG. 4 is a side view of an alternative separation member.
Figure 5:
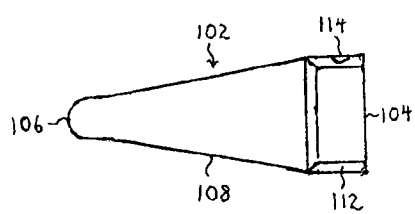
FIG. 5 is a top view of the separation member shown in FIG. 4.

Referring to FIGS. 4 and 5, which are of the same scale as FIGS. 1 and 2, one example of an alternative separation member is shown at 102 in side and top views, respectively. Like separation member 66, separation member 102 also decreases or remains constant in width as extending from its rear end 104 to its rounded front end 106, with at least a portion indicated at 108 being tapered so as to progressively decrease in width toward front end 106. In addition, an opening 110 (indicated by broken lines in FIG. 4) is provided in a rear portion 112 for receiving a front end portion of the rod (not shown), and a hole 114 is provided in rear portion 112 for threadedly receiving a set screw (also not shown). However, separation member 102 differs from separation member 66 insofar as being narrower in width and somewhat longer, so as to be more suitable for opening the ears of, for example, an antelope.

Regardless of the configuration of the separation member, it is most preferably fabricated from aluminum. Aluminum is very cost effective in the manufacture of the separation member, and is highly durable insofar as it will not rust. It is further preferred that edges of the separation member are at least slightly rounded off to minimize the possibility of tearing or otherwise damaging skin while such skin is being separated from cartilage.

Obviously, many modifications and variations of the present invention are possible in light of the above teachings. For example, according to certain broad aspects of the invention, mechanisms other than the trigger and driving dog could be employed to advance the rod and separation member forwardly. It is, therefore, to be understood that within the scope of the appended claims the invention can be practiced otherwise than as specifically described.

That which is claimed is:

1. A taxidermic ear opening tool for use upon an animal's ear which has skin with an underside thereof connected to cartilage, comprising:
   a tool body;
   a hook member fixedly connected to the tool body and having at least one prong that is engageable with the underside of the skin so as to secure the tool body with respect thereto;
   a rod having a longitudinal axis and opposing front and rear ends, the rod being received by the tool body so as to allow longitudinal movement of the rod with respect to the tool body;
   a separation member fixedly connected to the rod at or closely adjacent to its front end, the separation member lying in a plane substantially parallel and adjacent to the longitudinal axis of the rod; and
   a rod advancement means for moving the rod and associated separation member longitudinally and forwardly, whereby such forward movement of the separation member as positioned between the skin and cartilage separates the skin from the cartilage.

2. A taxidermic ear opening tool as recited in claim 1 wherein the tool body has a top and a bottom, and wherein the ear opening tool further comprises a handle fixedly depending from the bottom of the tool body.

3. A taxidermic ear opening tool as recited in claim 2 wherein the hook member is fixedly connected to the top of the tool body.

4. A taxidermic ear opening tool as recited in claim 2 wherein the rod advancement means includes a trigger pivotally connected to the tool body adjacent to the handle and being operably coupled to the rod so that pivotal movement of the trigger moves the rod and associated separation member longitudinally and forwardly.

5. A taxidermic ear opening tool as recited in claim 4 further comprising a member received on the rod which is selectively positionable to prevent or allow rearward movement of the rod and associated separation member.

6. A taxidermic ear opening tool as recited in claim 1 wherein the tool body has at least one opening through which the rod is slidably received.

7. A taxidermic ear opening tool as recited in claim 1 wherein the separation member has opposing front and rear ends, and decreases or remains constant in width as extending from its rear end to its front end, at least a portion of the separation member being tapered so as to progressively decrease in width toward its front end.

8. A taxidermic ear opening tool as recited in claim 7 wherein the front end of the separation member is generally rounded in shape.

9. A taxidermic ear opening tool as recited in claim 1 wherein the separation member is fixedly but removably connected to the rod.

10. A taxidermic ear opening tool as recited in claim 1 wherein the forward movement imparted by the rod advancement means to the separation member, as connected to the rod, is in a direction away from the tool body.

\* \* \* \* \*